(12) United States Patent  (10) Patent No.: US 8,950,553 B2
Nopper  (45) Date of Patent: Feb. 10, 2015

(54) SAFETY BAR

(75) Inventor: Roland Stefan Nopper, Mississauga (CA)

(73) Assignee: Lakeport Metalcraft and Welding (CA)

( * ) Notice: Subject to any disclaimer, the term of this patent is extended or adjusted under 35 U.S.C. 154(b) by 166 days.

(21) Appl. No.: 12/980,596

(22) Filed: Dec. 29, 2010

(65) Prior Publication Data

US 2012/0169075 A1    Jul. 5, 2012

(51) Int. Cl.
  *B66F 9/075*  (2006.01)
  *B60R 21/02*  (2006.01)

(52) U.S. Cl.
  CPC ............. *B60R 21/02* (2013.01); *B66F 9/07545* (2013.01)
  USPC ........... 187/222; 187/227; 280/748; 280/756; 248/340; 248/227.4; 248/215; 180/89.12

(58) Field of Classification Search
  CPC ..... B66F 9/075; B66F 9/07545; B66F 17/003
  USPC ........... 248/205.2, 211, 214, 215, 227.4, 340, 248/748, 756; 180/89.12, 89.13, 89.17, 180/89.18; 187/222, 225, 226, 227, 232, 187/237; 280/748, 756, 749; 414/914
  See application file for complete search history.

(56) References Cited

U.S. PATENT DOCUMENTS

| | | | | |
|---|---|---|---|---|
| 1,924,074 A * | 8/1933 | O'Halloran | ................. | 248/214 |
| 1,940,035 A * | 12/1933 | Washburn | ..................... | 100/195 |
| 2,263,981 A * | 11/1941 | Dalecke et al. | ............... | 414/634 |
| 2,460,193 A * | 1/1949 | Raudenkolb | ................... | 248/214 |
| 2,808,942 A * | 10/1957 | Harrison et al. | ........ | 211/119.004 |
| 3,163,389 A * | 12/1964 | Thornburgh | ................... | 248/211 |
| 3,289,871 A * | 12/1966 | La Tourneau et al. | ......... | 414/635 |
| 3,841,698 A * | 10/1974 | Stammen | ................. | 296/107.03 |
| 3,933,371 A * | 1/1976 | Graham | ........................ | 280/756 |
| 4,026,597 A * | 5/1977 | Miller et al. | ............. | 296/107.03 |
| 4,266,808 A * | 5/1981 | Fassett | ........................... | 280/756 |
| D271,151 S | 10/1983 | Kirby et al. | | |
| 4,411,464 A * | 10/1983 | Bauer | ........................... | 296/102 |
| 4,538,752 A * | 9/1985 | Welter | ......................... | 224/309 |
| 5,303,815 A * | 4/1994 | Dooley | ......................... | 198/680 |
| D376,242 S | 12/1996 | Jung et al. | | |
| 5,820,199 A | 10/1998 | Camplin et al. | | |
| 6,206,628 B1 * | 3/2001 | McDermott | .................. | 414/607 |
| 6,220,656 B1 * | 4/2001 | Martin, Jr. | .................... | 296/215 |
| 6,223,914 B1 * | 5/2001 | Snell | ........................ | 211/119.04 |
| 6,325,449 B1 | 12/2001 | Sorensen et al. | | |

(Continued)

OTHER PUBLICATIONS

U.S. Appl. No. 29/391,313, Notice of Allowance mailed Aug. 9, 2012, 10 pgs.

(Continued)

*Primary Examiner* — Terrell McKinnon
*Assistant Examiner* — Eret McNichols
(74) *Attorney, Agent, or Firm* — Schwegman Lundberg & Woessner, P.A.

(57) ABSTRACT

Disclosed is a safety bar having a resiliently flexible neck connecting a shaft to a head. The head includes a surface connected to at least one pair of spaced apart opposing legs. The surface and the spaced apart opposing legs define a passage and a channel intermediate the surface and the passage. Also disclosed is a method of making such a safety bar. The safety bar can be installed in a reach lift truck for protecting an operator of the reach lift truck from injury due to accidental impact.

14 Claims, 18 Drawing Sheets

(56) References Cited

U.S. PATENT DOCUMENTS

| | | |
|---|---|---|
| 6,582,010 B2 | 6/2003 | Sakyo et al. |
| D479,796 S * | 9/2003 | Snell ............................ D8/372 |
| D497,700 S | 10/2004 | Polvilampi et al. |
| D539,504 S | 3/2007 | Quinlan, Jr. et al. |
| D544,174 S | 6/2007 | Quinlan, Jr. et al. |
| D556,027 S * | 11/2007 | Cuzzocrea ..................... D8/373 |
| D557,474 S | 12/2007 | Kouyama et al. |
| D580,124 S | 11/2008 | Babel et al. |
| D584,873 S | 1/2009 | Kuraoka et al. |
| D587,423 S | 2/2009 | Stark |
| D587,424 S | 2/2009 | Stark |
| D594,172 S | 6/2009 | Shibata et al. |
| D594,173 S | 6/2009 | Shibata et al. |
| 7,789,359 B2 * | 9/2010 | Chopp et al. .................. 248/211 |
| D650,959 S | 12/2011 | Gilbride et al. |
| D673,753 S | 1/2013 | Nopper |
| 2004/0163865 A1 | 8/2004 | Shimokakiuchi et al. |
| 2007/0063545 A1 * | 3/2007 | Martin ..................... 296/190.01 |

OTHER PUBLICATIONS

U.S. Appl. No. 29/391,313, Response Filed Jul. 30, 2012 to Restriction Requirement mailed Jun. 29, 2012, 4 pgs.

U.S. Appl. No. 29/391,313, Restriction Requirement mailed Jun. 29, 2012, 5 pgs.

U.S. Appl. No. 29/437,064, Final Office Action mailed Jun. 28, 2013, 6 pgs.

* cited by examiner

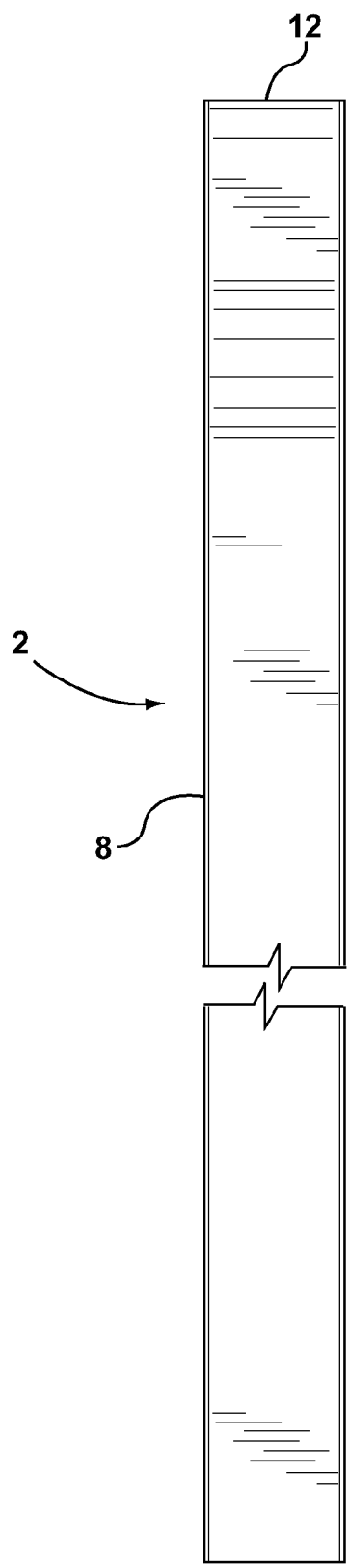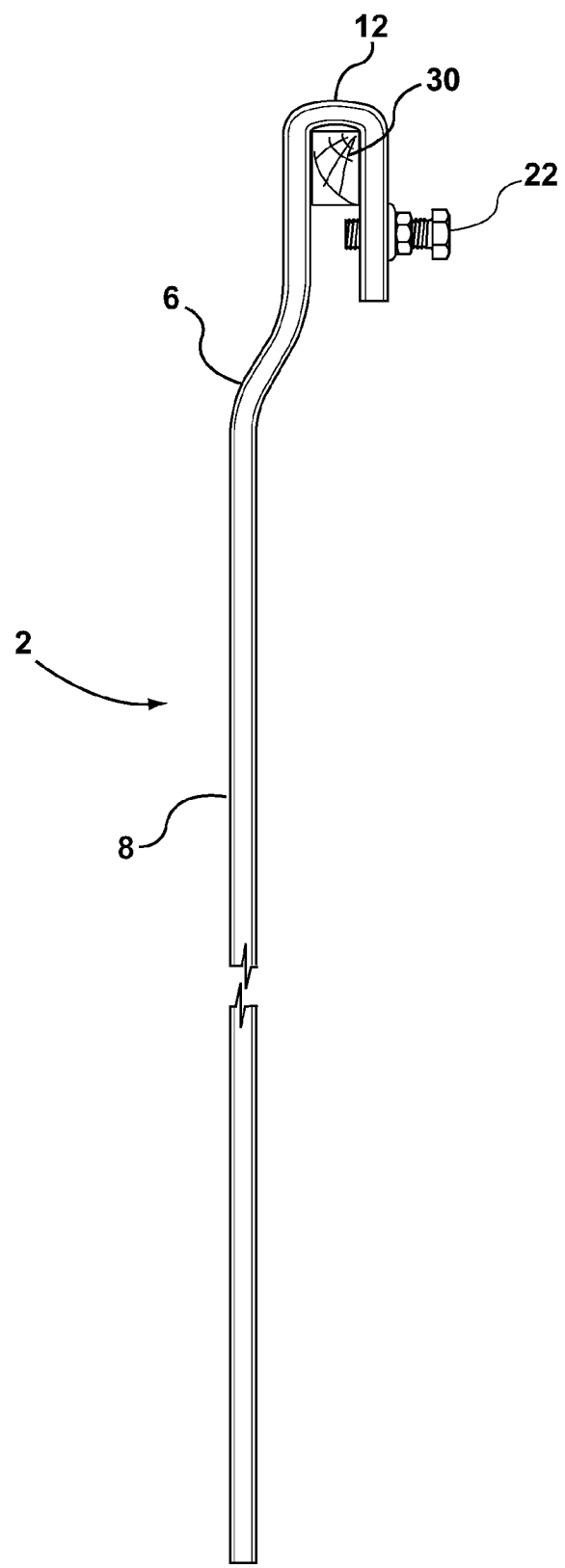
FIG. 6  FIG. 7

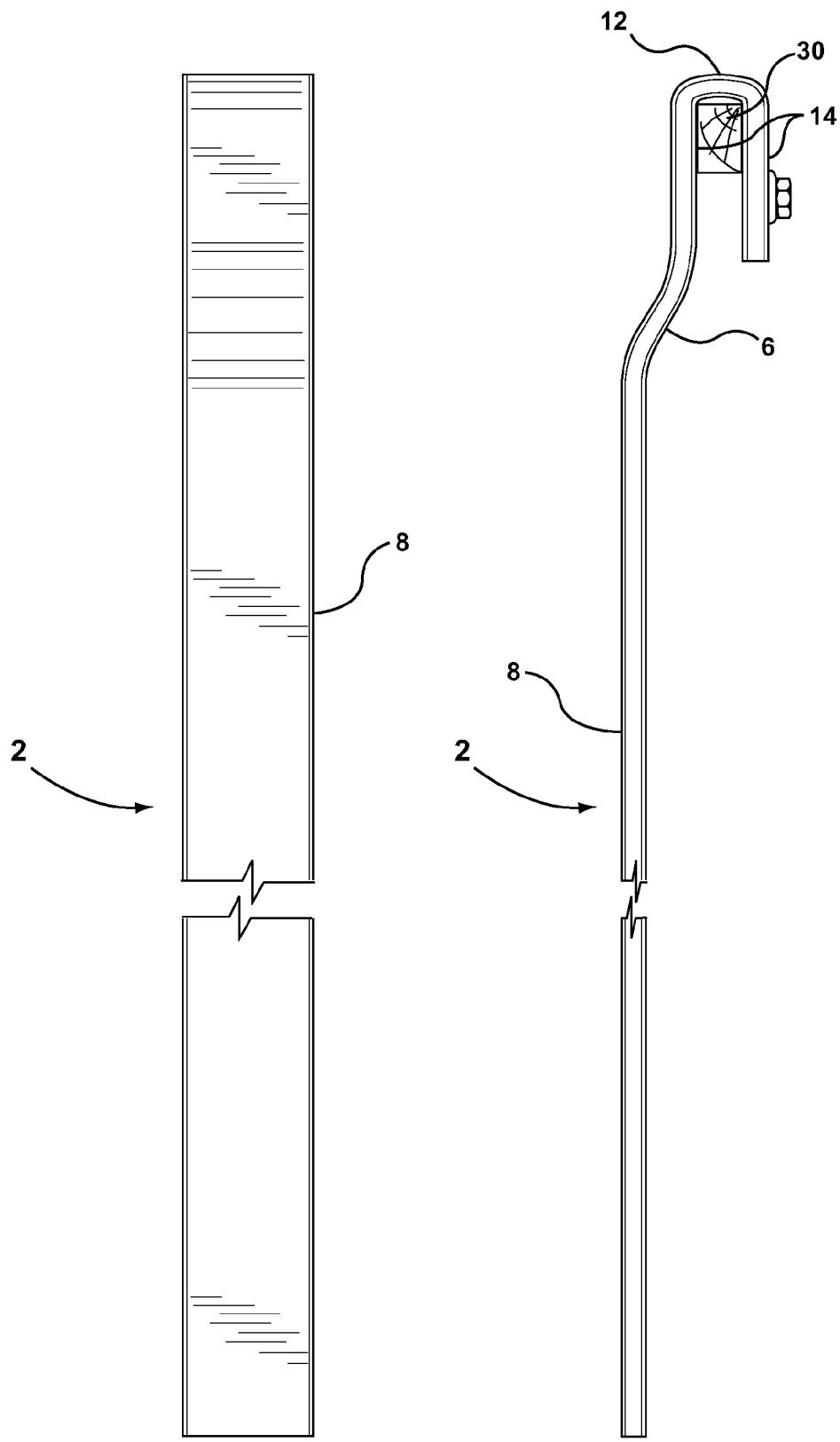

SAFETY BAR

TECHNICAL FIELD

Example embodiments relate to safety bars for a reach truck or a similar vehicle.

BACKGROUND

Reach trucks are used in warehouse environments to transport palletized goods. A lift mechanism on the front of the truck allows pallets to be lifted from shelving units and moved or rearranged. Reach trucks are operated by a operator who either sits or stands at the controls in the reach truck. An overhead guard, which is attached to the lift mechanism and/ or a corner post of the chassis, protects the driver from falling or dropped objects. While the operator is protected from above by the lift mechanism of the reach truck, the operator can be left completely unprotected on the remaining two or three sides of the reach truck from the top of the chassis to the bottom of the overhead guard. The operator may thus be vulnerable to being seriously injured or impaled by accidental side impact with fixed objects such as storage shelving.

SUMMARY

In one aspect, an example embodiment relates to a safety bar, comprising:
  a resiliently flexible neck connecting a shaft to a head;
  the head comprising a surface connected to at least one pair of spaced apart opposing legs; and
  the surface and the spaced apart opposing legs defining a passage and a channel, the channel intermediate the surface and the passage.

In another aspect, an example embodiment relates to a method of forming a safety bar having a resiliently flexible neck connecting a head to a shaft, the method comprising:
  forming a bar having the resiliently flexible neck connecting the head to the shaft, the head comprising a surface connected to at least a pair of spaced apart opposing legs; and the surface and the spaced apart opposing legs defining a passage and a channel intermediate the surface and the passage.

In still another aspect, there is described a method of installing a safety bar on a vehicle such as a reach truck, the safety bar having a resiliently flexible neck connecting a shaft to a head, the head comprising a surface connected to at least one pair of spaced apart opposing legs, and the surface and the spaced apart opposing legs defining a passage and a channel, the channel intermediate the surface and the passage; the method comprising the steps of:
  placing a spacer in the channel;
  positioning an outer frame of an overhead guard of the reach truck in the passage;
  connecting the distal end of the shaft to the reach truck;
  fastening the outer frame of the overhead guard of the reach truck in the passage; and
  removing the spacer from the channel.

BRIEF DESCRIPTION OF THE FIGURES

FIG. 6 is a rear elevational view of an embodiment of the safety bar.

FIG. 7 is a right side elevational view of an embodiment of the safety bar.

FIG. 14 is a rear elevational view of the second embodiment of the safety bar.

FIG. 15 is a right side elevational view of the second embodiment of the safety bar.

DETAILED DESCRIPTION

It would be advantageous to provide a safety bar that can be removably affixed to the outer frame of the overhead guard and the reach truck or a chassis of a reach truck to protect the operator from accidental injury. Moreover, there is a need in the art for a safety bar designed to provide protection to the operator against accidental impact that does not significantly reduce the protective capability of the overhead guard. In addition, there is a need in the art for a safety bar that does not impair the operator's visibility.

Figure 1:
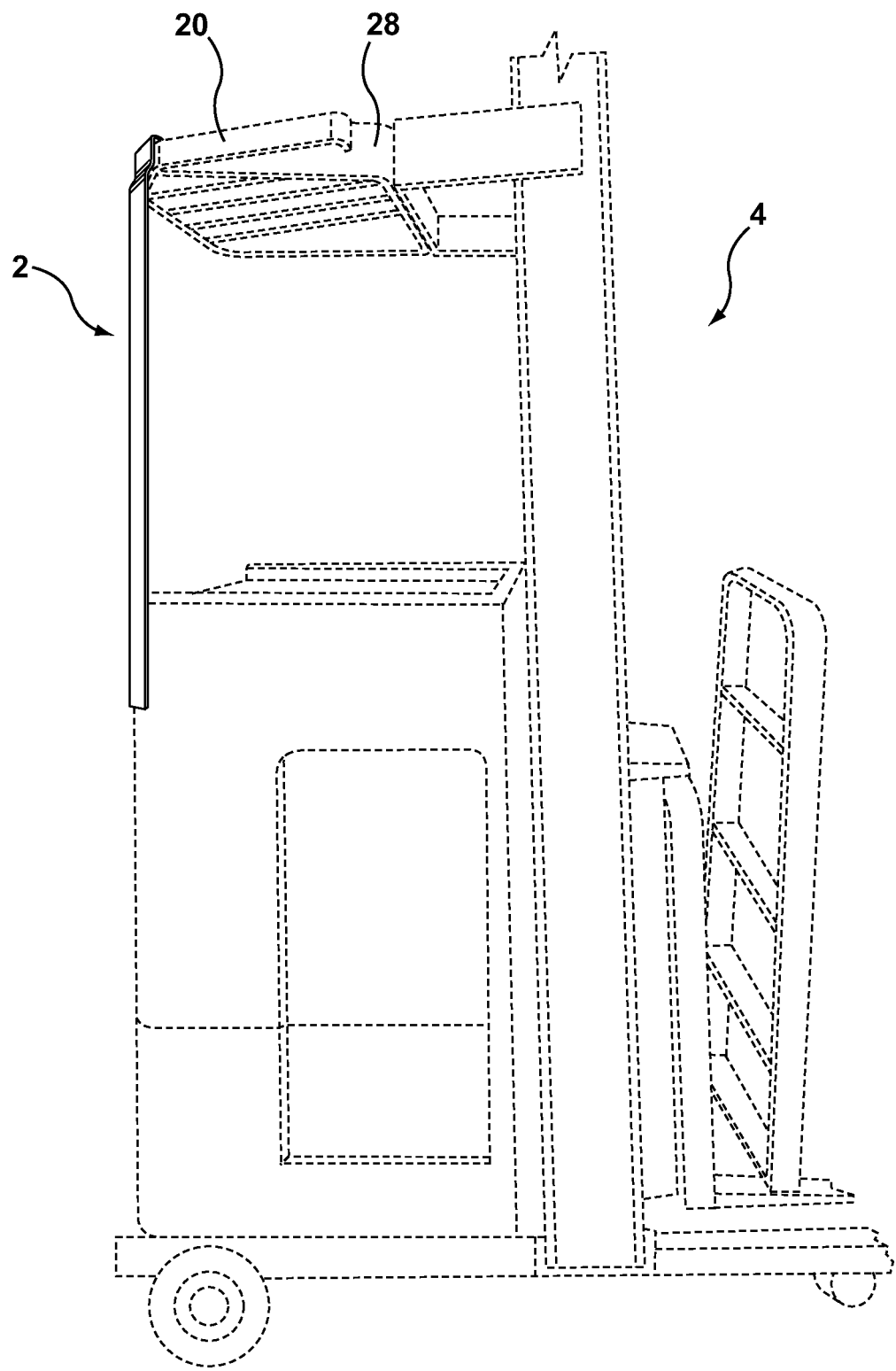
FIG. 1 is a perspective view of an example embodiment of a safety bar attached to a reach truck (shown in phantom).
Figures 2, 3:
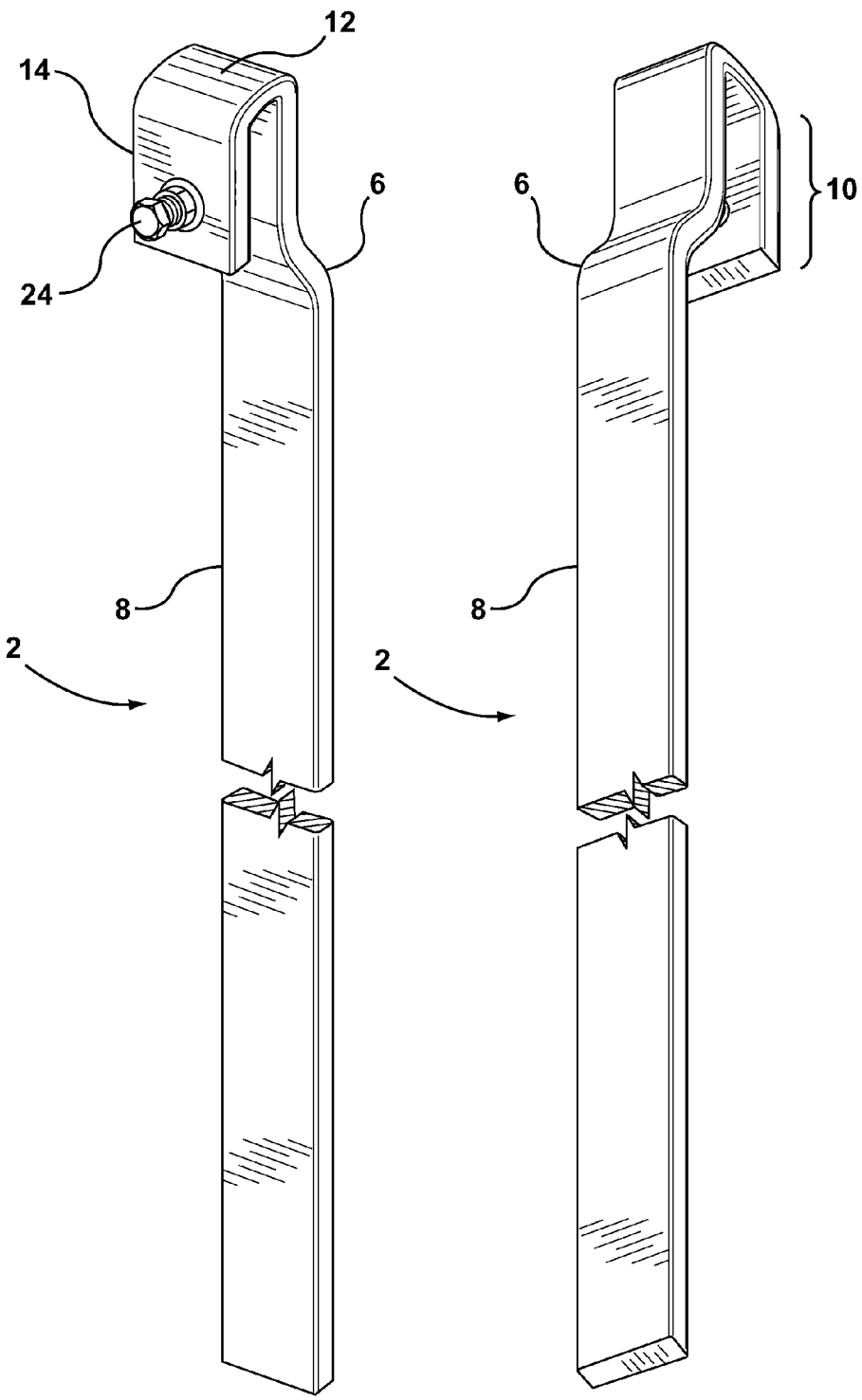
FIG. 2 is a front perspective view of an embodiment of the safety bar.
FIG. 3 is a rear perspective view of an embodiment of the safety bar.
Figures 4, 5:
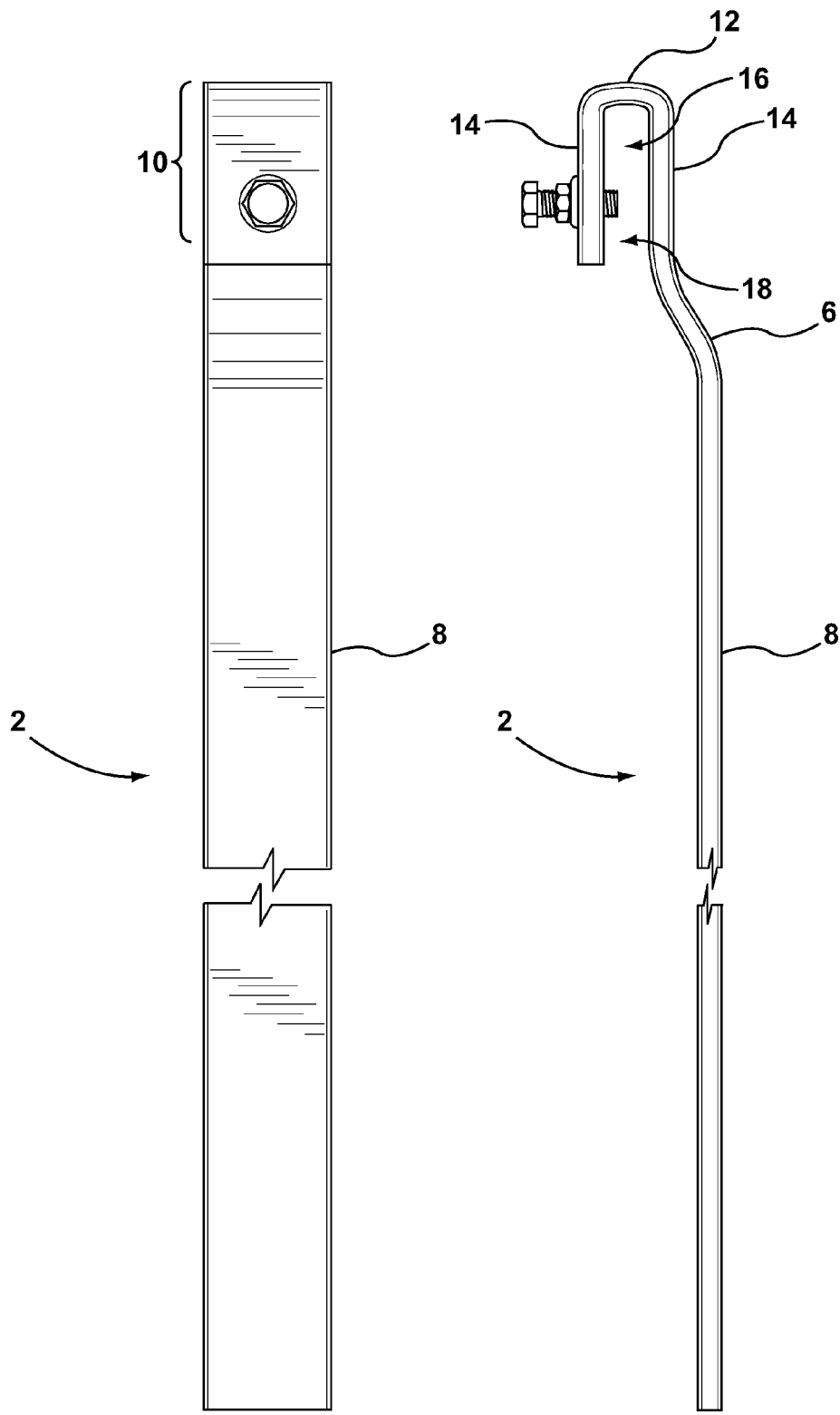
FIG. 4 is a front elevational view of an embodiment of the safety bar.
FIG. 5 is a left side elevational view of an embodiment of the safety bar.

Reference is now made to the Figures, which show safety bars in accordance with some example embodiments. Similar reference numbers are used in different embodiments for convenience of reference. FIG. 1 discloses a safety bar (2) in use, and attached to a reach truck (4). The safety bar (2) has a resiliently flexible neck (6) connecting a shaft (8) to a head (10) portion, as shown in FIGS. 2-7, 10-15 and 18. The head (10) of the safety bar (2) is attachable to an outer frame (20) of an over head guard (28) of the reach truck (4), while the shaft (8) or a base portion of the shaft (8) is attachable to the reach truck (4) for affixing the safety bar (2) to the reach truck (4).

In example embodiments as shown in FIGS. 2, 3, 5, 7, 10, 11, 13, 15 and 18, the head (10) has a surface (12) (also shown in FIGS. 8, 9, 16 and 17) connected to at least one pair of spaced apart opposing legs (14). The surface (12) and the at least one pair of spaced apart opposing legs (14) define a passage (18) and a channel (16), with the channel (16) being located in between the surface (12) and the passage (18). The passage (18) is adapted for receiving the outer frame (20) of the over head guard (28). The channel (16) is formed by the gap between the surface (12) and the outer frame (20) of the over head guard (28) positioned in the passage (18). When installing the safety bar (2), a shim or spacer (30) can be placed between the legs (14) and the surface (12) of the head (10). The legs (14) are of sufficient length to further receive the outer frame (20) of the over head guard (28). Once the over head guard (28) is positioned in the passage (18), it can be fastened using a bolt (24) to avoid displacement of the over head guard (28), wherein the bolt (24) frictionally engages the over head guard (28) to maintain the integrity of the over head guard (28). The spacer (30) can be removed from the channel (16) to establish the gap between the surface (12) of the head (10) and the outer frame (20) of the over head guard (28). The spacer (30) can be formed of any suitably rigid material, for example wood (as shown in FIGS. 7 and 15) or steel.

The height of the channel, i.e., from the surface (12) of the head (10) to the outer frame (20) of the over head guard (28) would be understood to be determinable by a person of skill in the art. In one embodiment, for example and without limitation, the height of the channel is 1 inch.

The shape of the head (10) in accordance with example embodiments is not particularly limited. In one embodiment, for example and without limitation, the head (10) can include an inverted U-shaped member, as shown in FIGS. 2, 3, 5, 7, 10, 11, 13, 15 and 18. In use, the outer frame (20) of the over head guard (28) is positioned adjacent to the shaft (8). The shaft (8) is lowered to allow the head (10) of the safety bar (2) to straddle over the outer frame (20) of the over head guard (28). In one embodiment, for example and without limitation, as shown in the Figures referenced above, the resiliently flexible neck (6) is connected to a leg (14) of the inverted U-shaped member.

Figure 8:
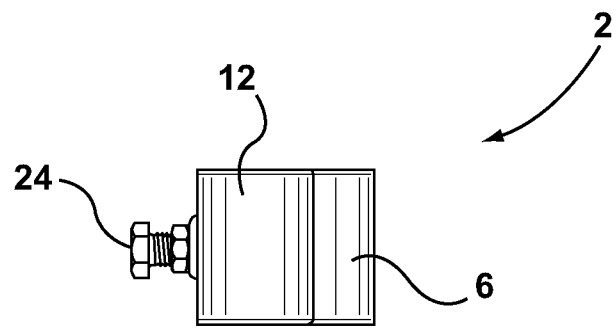
FIG. 8 is a top plan view of an embodiment of the safety bar.
Figure 9:
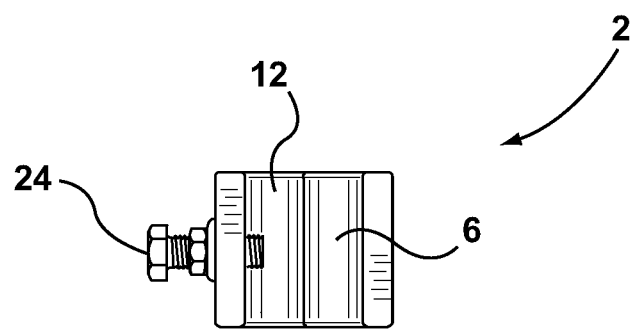
FIG. 9 is a bottom plan view of an embodiment of the safety bar.

In one embodiment, for example and without limitation, the outer frame (20) of the over head guard (28) is held in place in the passage (18) by a fastening means (FIGS. 8 and 9). The fastening means are not particularly limited, and different fastening means can be used to fasten the outer frame (20) of the over head guard (28) in the passage (18). In one embodiment, for example and without limitation, the leg (14) has an aperture (22) adapted for receiving a fastener for fastening the outer frame (20) of the over head guard (28) in the passage (18). The fastener can be, for example and without limitation, a screw or a bolt (24). The aperture adapted for receiving the fastener can be threaded.

The resiliently flexible neck (6) in accordance with example embodiments is not particularly limited and can be determined by a person of skill in the art. In one embodiment, the resiliently flexible neck (6) is, for example and without limitation, an arcuate neck (FIGS. 2, 3, 5, 7, 10, 11, 13 and 15). The arcuate neck can result in the head (10) being offset from a longitudinal axis of the shaft (8). In one embodiment, for example and without limitation, the longitudinal axes of each of the at least one pair of spaced apart opposing legs (14) is parallel to and offset from a longitudinal axis of the shaft (8).

As described above, the distal end of the shaft (8), i.e. distal from the head (10), is attachable to the reach truck (4). In one embodiment, for example and without limitation, the distal end of the shaft (8) is fastened to the reach truck (4). Means of fastening a distal end of the shaft (8) to the reach truck (4) should be known to a person of skill in the art or can be determined. In one embodiment, for example and without limitation, the distal end of the shaft (8) has an aperture (40)(FIG. 19) adapted for receiving a fastening means. Similar fastening means as described herein can be used to for fastening the shaft (8) to the reach truck (4). In some example embodiments, the fastening means can include a bolt, or the like.

The cross sectional shape of the safety bar (2) or the shaft (8) of the safety bar (2) may not be particularly limited. In one embodiment, for example and without limitation, the shaft (8) has an I-beam or a hollow rectangular cross section. Further, the safety bar (2) can be, for example and without limitation, of unitary construction. Moreover, the material used to form the safety bar (2) is not particularly limited and should be understood or can be determined by a person of skill in the art, and which can provide the desired rigidity and flexibility. In one embodiment, for example and without limitation, the safety bar (2) is formed of steel.

When in use the safety bar (2) can provide protection to the operator while reducing the deformation of the outer frame (20) of the over head guard (28). Accidental impact perpendicular to the longitudinal axis of the shaft (8) can result in downward movement of the safety bar (2). The passage (18) and the channel (16) allow movement of the outer frame (20) of the over head guard (28) and can reduce the deformation force, and therefore the impact and deformation, of the over head guard (28). Upon accidental impact, the shaft (8) may bend causing the head (10) of the safety bar (2) to move downwards. The channel (16) can permit the outer frame (20) of the over head guard (28) to slide into the channel (16). Moreover, presence of the channel (16) can reduce the force that would be applied on the outer frame (20) of the over head guard (28) compared to the force applied when the channel (16) is not present. This can result in reduced deformation of the outer frame (20) of the over head guard (28) while providing protection to the operator.

Figures 10, 11:
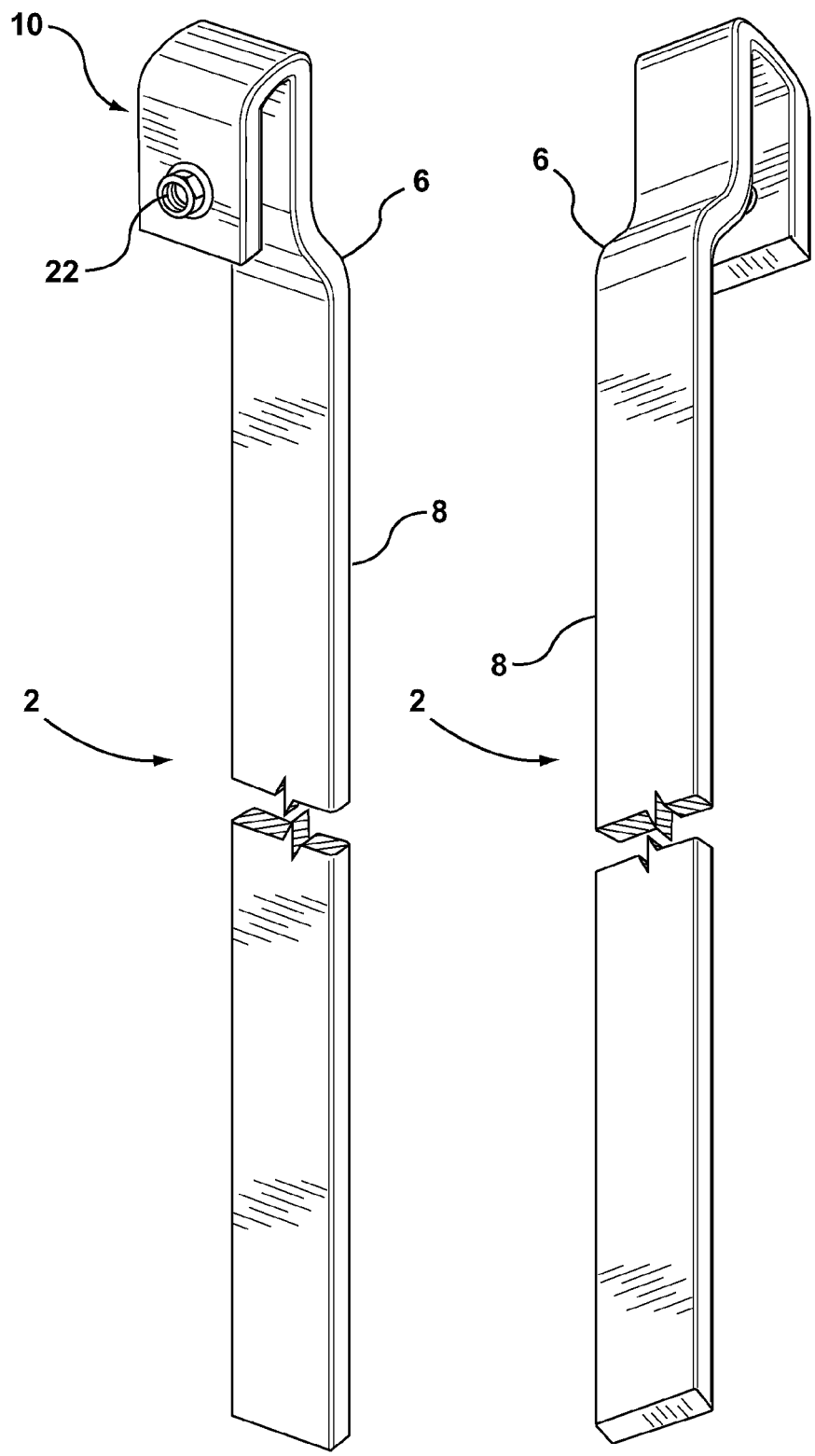
FIG. 10 is a front perspective view of a second example embodiment of a safety bar.
FIG. 11 is a rear perspective view of the second embodiment of the safety bar.
Figure 12:
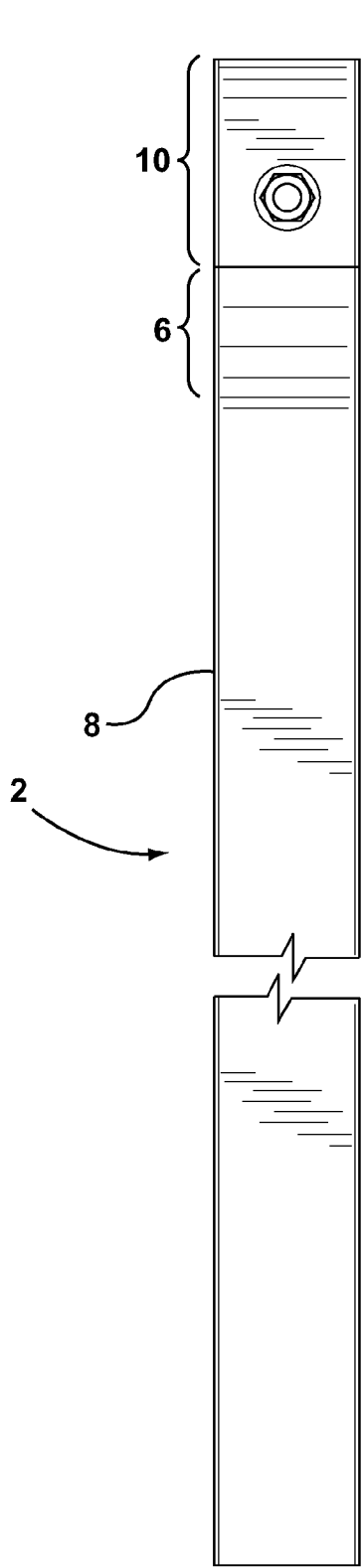
FIG. 12 is a front elevational view of the second embodiment of the safety bar.
Figure 13:
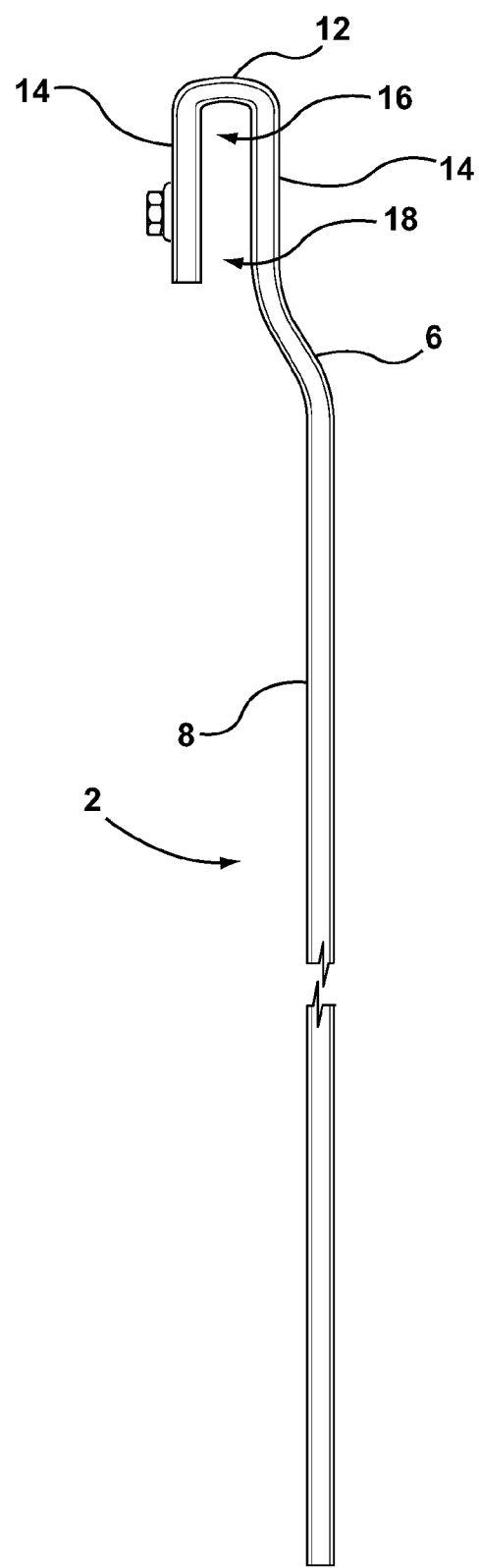
FIG. 13 is a left side elevational view of the second embodiment of the safety bar.
Figure 16:
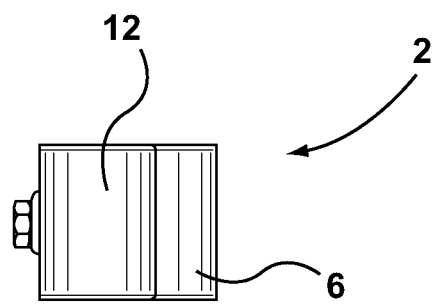
FIG. 16 is a top plan view of the second embodiment of the safety bar.
Figure 17:
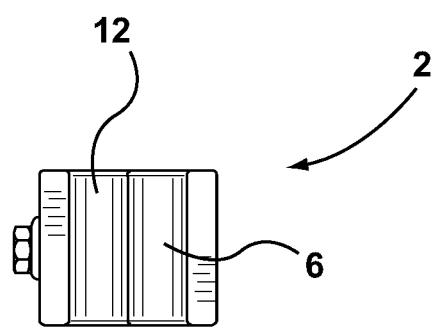
FIG. 17 is a bottom plan view of the second embodiment of the safety bar.

Referring to FIG. 10, in the second example embodiment the safety bar (2) is provided without the bolt 24, as in FIG. 1. For example, the customer can provide their own bolt 24 using standard stock parts.

Figure 18:
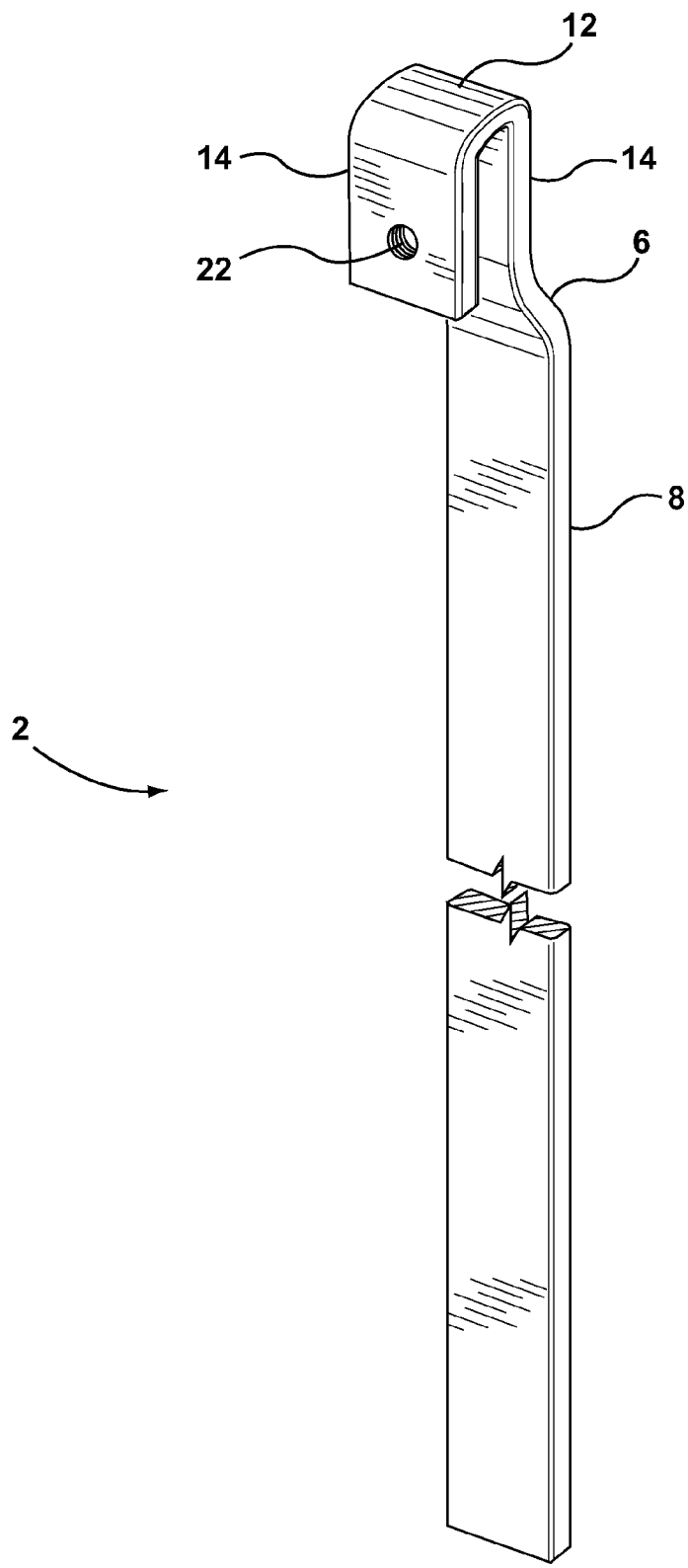
FIG. 18 is a front perspective view of a third example embodiment of a safety bar.

Referring to FIG. 18, in the third example embodiment the aperture (22) of the safety bar (2) is integrated within the leg (14) of the safety bar (2), rather than protruding from the leg (14) as in the first example embodiment (FIG. 1).

According to another aspect, there is described is a method of forming a safety bar (2) having a resiliently flexible neck (6) connecting a head (10) to a shaft (8). The method comprising forming a bar to have the resiliently flexible neck (6) connecting the head (10) to the shaft (8). The head (10) comprising a surface (12) connected to at least a pair of spaced apart opposing legs (14). The surface (12) and the spaced apart opposing legs (14) defining a passage (18) and a channel (16) intermediate the surface (12) and the passage (18). The method can be used to form the safety bar (2) as described herein.

The method of forming is not particularly limited and should be known or can be determined by a person of skill in the art. In one embodiment, for example and without limitation, the method of forming can be moulding, casting or welding.

According to another aspect, there is described a method of installing the safety bar (2), as described herein, on a vehicle such as a reach truck (4). The method comprising placing a spacer (30) in the channel (16); positioning the outer frame (20) of an overhead guard (28) of the reach truck (4) in the passage (18); connecting the distal end of the shaft (8) to the reach truck (4); fastening the outer frame (20) of the overhead guard (28) of the reach truck (4) in the passage and removing the spacer (30) from the channel (16).

The following examples are for the purpose of illustrating example embodiments and in no way to be construed as limiting.

Standard and custom testing was performed on a safety bar (2) sample, in accordance with ASME B56.1-2004, Section 7.29.2 and additional specifications, as would be understood in the art.

A sample of a safety bar (2) was installed on a 4,500 lbs capacity reach lift truck for testing. The sample was a 2½"× ½" flat steel bar attached on the lift truck body with two ½" screws and secured to the overhead guard outer frame with a ½" positioning screw, with U channel one inch above the overhead rail as a flexible link, in order to avoid overhead deformation in the event of safety bar impact.

The objective of the work was to provide information needed to evaluate the capability of the innovative safety bar to protect the operator against accidental impact, without reducing the overhead guard protective capability as a result of the safety bar installation.

Instrumentation

The following instruments were used to measure load and displacement values:

| | |
|---|---|
| 10 kip Load Cell | MII # B06835 |
| MTS 407 signal conditioner | MII # B06083 |
| Displacement transducer | MII # B12562 |
| MTS 407 signal conditioner | MII # B06077 |
| Displacement transducer | S/N 55583 |
| MTS 407 signal conditioner | MII # B06082 |
| Spider 8 DAQ | MII # A14020 |
| Weight scale | MII # A04941 |
| Measuring tape | MII # B10834 |

Test Procedure

As a result of the safety bar installation between the lift truck body and overhead guard, the lift truck with the safety bar installed was tested in accordance with ASME B56.1-2004 Safety Standard for Low Lift and High Lift Trucks, Section 7.29.2 (Cube Drop Test and Impact Drop Test) in order to assess if the overhead guard will still perform as required by the standard.

The safety bar was tested for strength at mid span in order to assess the safety of the operator in the event of an impact while the loaded lift truck travels under certain speed (Custom Bend Test). The details of each test procedure are described below.

Cube Drop Test (Section 7.29.2 from ASME B56.1-2004)

The lift truck with the safety bar installed was seated on a flat surface. A safety device consisting of metal beams and square tubes was configured around the overhead guard area, in order to capture the wood cube during testing. A wood structure with 300 mm×300 mm hard wood base was designed and manufactured as the required test fixture. The wood fixture was attached to an overhead crane through a quick release mechanism and placed above the overhead guard with its centre within 600 mm diameter circle above the operator position.

Figure 19:
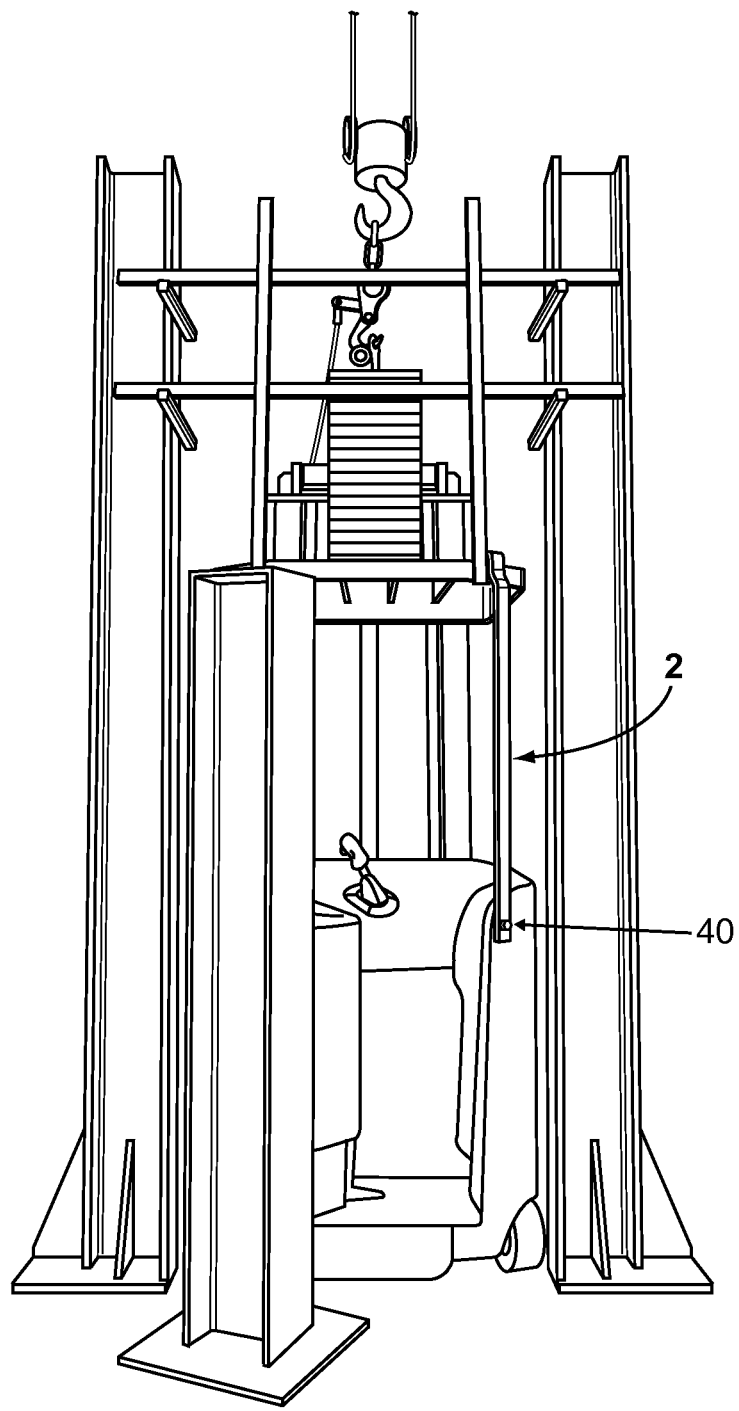
FIG. 19 is an illustration of the test set-up for a cube drop test on an embodiment.
Figure 20:
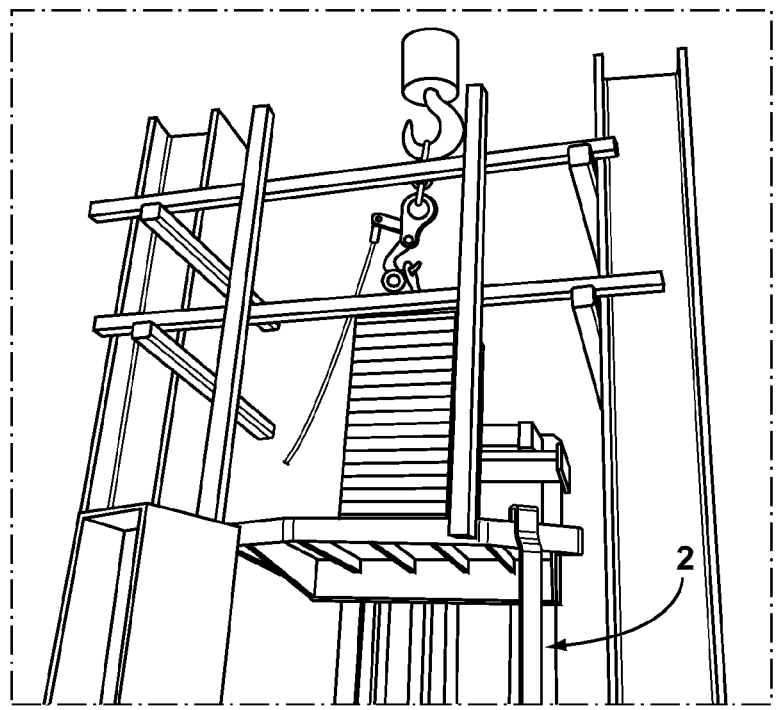
FIG. 20 is an illustration of the test set-up for a cube drop test on an embodiment.

An illustration of the test set-up is presented in FIGS. 19 and 20.

The drop wood fixture was released to free fall ten (10) times from 1,525 mm height above the overhead guard on a round area of 600 mm diameter above the operator position. A displacement transducer was configured to measure the deformation of the overhead guard after each drop test at the unsupported overhead guard corner as worse case scenario location (should be less than 19 mm from original head clearance).

Figure 21:
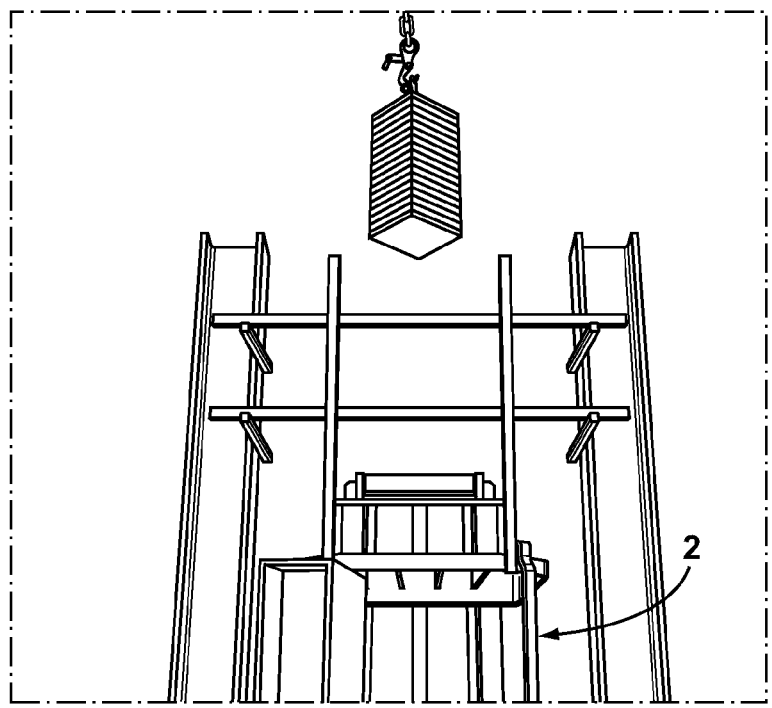
FIG. 21 is an illustration of the wood drop fixture in a raised position for performing the cube drop test on an embodiment.
Figure 22:
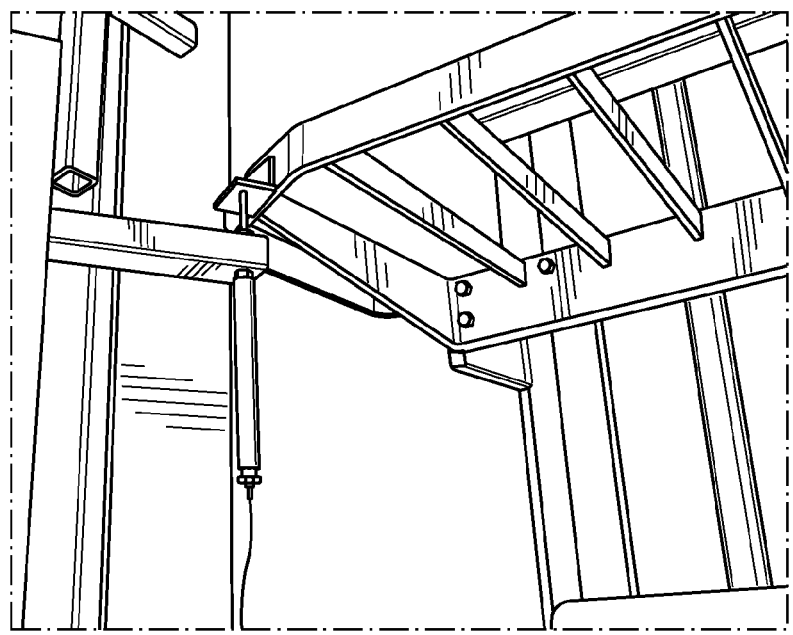
FIG. 22 is an illustration of the displacement transducer in use for performing the cube drop test on an embodiment.

The illustrations of the wood drop fixture in raised position and displacement transducer are presented in FIGS. 21 and 22.

Impact Drop Test (Section 7.29.2 from ASME B56.1-2004)

The lift truck with the safety bar installed was seated on a flat surface. A wood structure consisting of 40 mm×90 mm cross section lumber, 3600 mm length and 1000 mm width was bound together with metal straps to obtain the required test weight of 680 kg corresponding to the truck lift capacity of 1,966 kg at 600 mm load centre. The wood impact fixture was attached to an overhead crane through a quick release mechanism and placed above the overhead guard.

Figure 23:
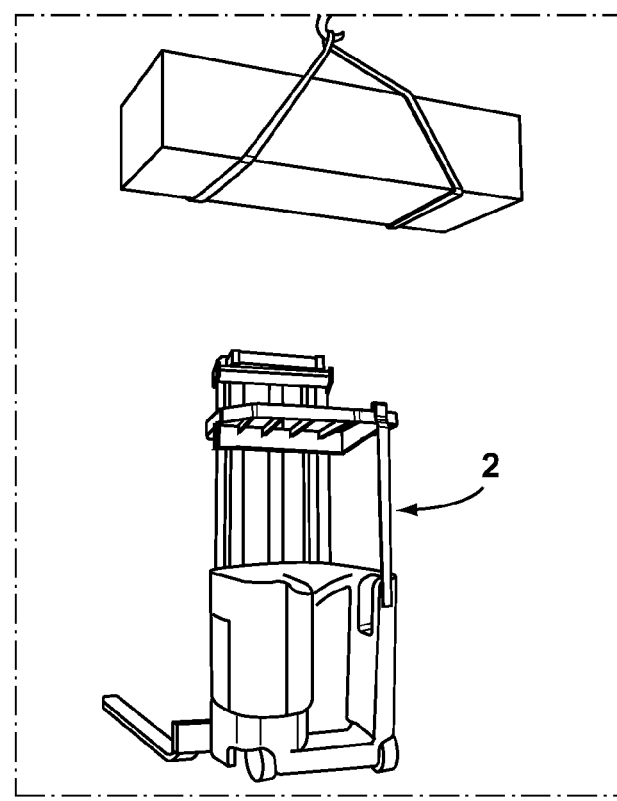
FIG. 23 is an illustration of the test set-up for an impact drop test on an embodiment.
Figure 24:
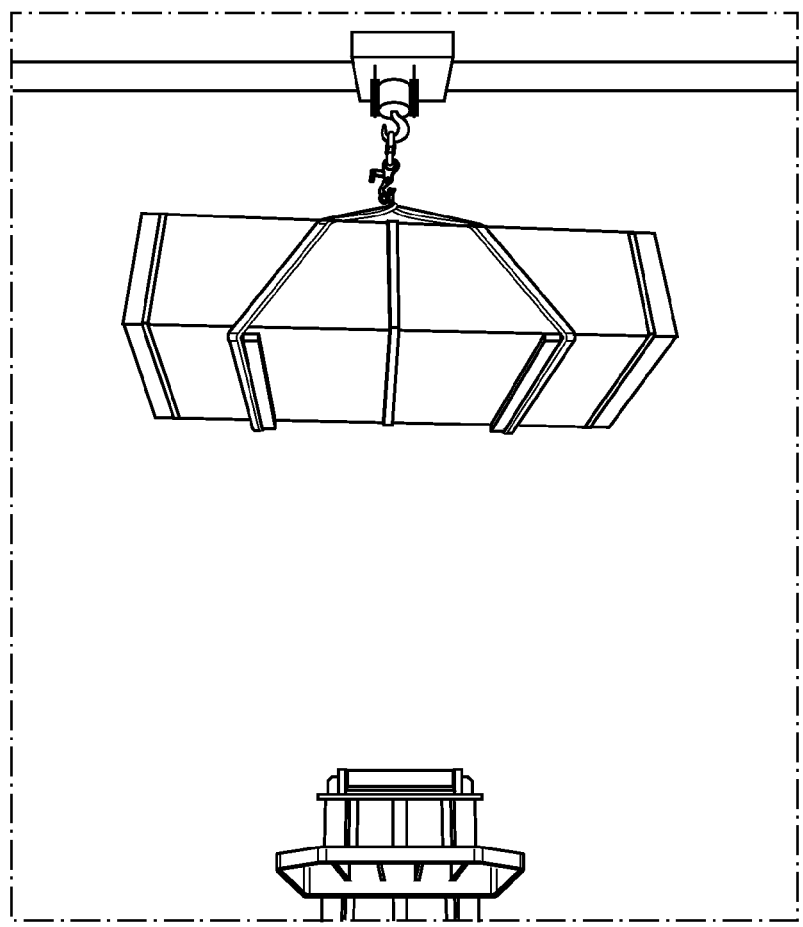
FIG. 24 is an illustration of the test set-up for an impact drop test on an embodiment.

The illustrations of the test set-up are presented in FIGS. 23 and 24.

The impact wood fixture was released to free fall from 1,620 mm height above the overhead guard in order to obtain the required test energy of 10,800 Joules. The distance between the surface where the operator stands and a horizontal plane tangent to the underside of the overhead guard was measured after the impact test (shall be higher than 1,625 mm).

Safety Bar Strength (Custom Bend Test)

The lift truck with the safety bar installed was securely attached to the mechanical test platform as per in service orientation. A servo-hydraulic actuator secured on a vertical post, equipped with a 25 kip load cell and a displacement transducer was configured to apply the horizontal bending force at the centre span of the safety bar.

Figure 25:
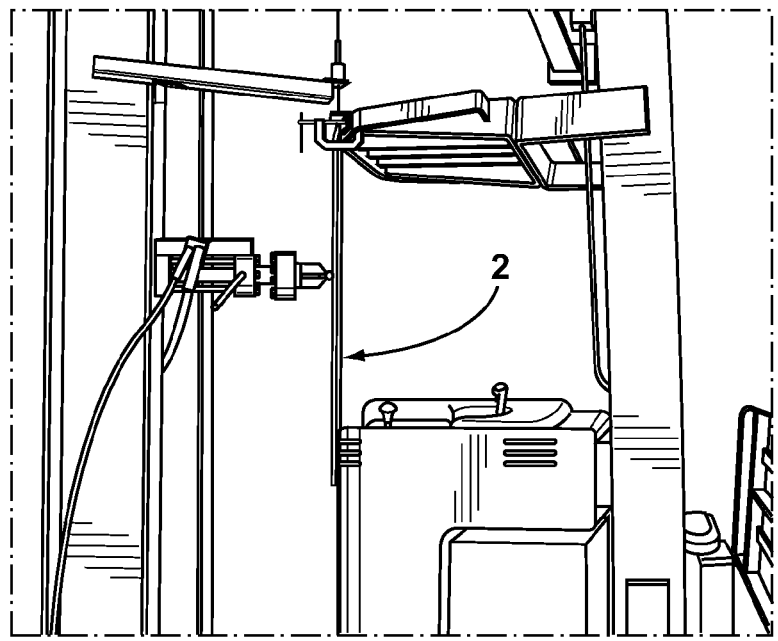
FIG. 25 is an illustration showing the general view of the test set-up for a custom bend test on an embodiment.
Figure 26:
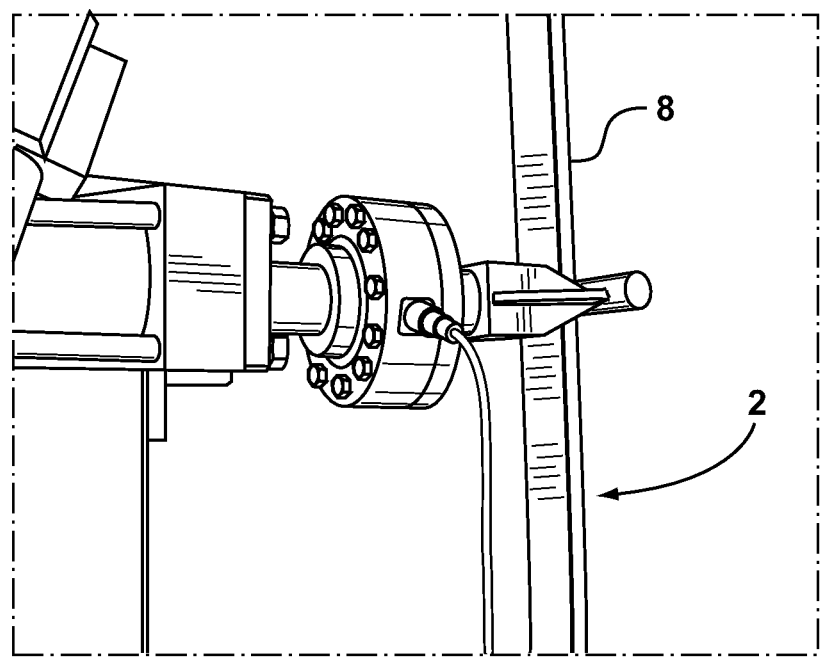
FIG. 26 is an illustration showing the load cell and loading fixture for a custom bend test on an embodiment.

The illustrations of the test set-up are presented in FIGS. 25 and 26.

Results

The detailed test results for all tests performed are presented below.

Cube Drop Test (Section 7.29.2 from ASME B56.1-2004)

The deformation of the overhead guard after each drop test, at the unsupported corner, considering as a reference the position of the guard prior testing is presented in the Table 1 below.

TABLE 1

Cube drop test results

| Drop Test Number | Overhead Guard Deformation (mm) |
|---|---|
| 1 | 2.131 |
| 2 | 3.545 |
| 3 | 5.021 |
| 4 | 5.962 |
| 5 | 7.811 |
| 6 | 8.655 |
| 7 | 9.442 |
| 8 | 10.142 |
| 9 | 10.586 |
| 10 | 11.049 |

An inspection was performed at the test completion on the overhead guard and no parts separation or other major failures were observed. The overhead guard slightly bent as a result of the cube drop test application. At the safety bar support corner, the overhead guard slipped through the safety bar and slightly bent the positioning screw, by approximately 6 mm.

Figure 27:
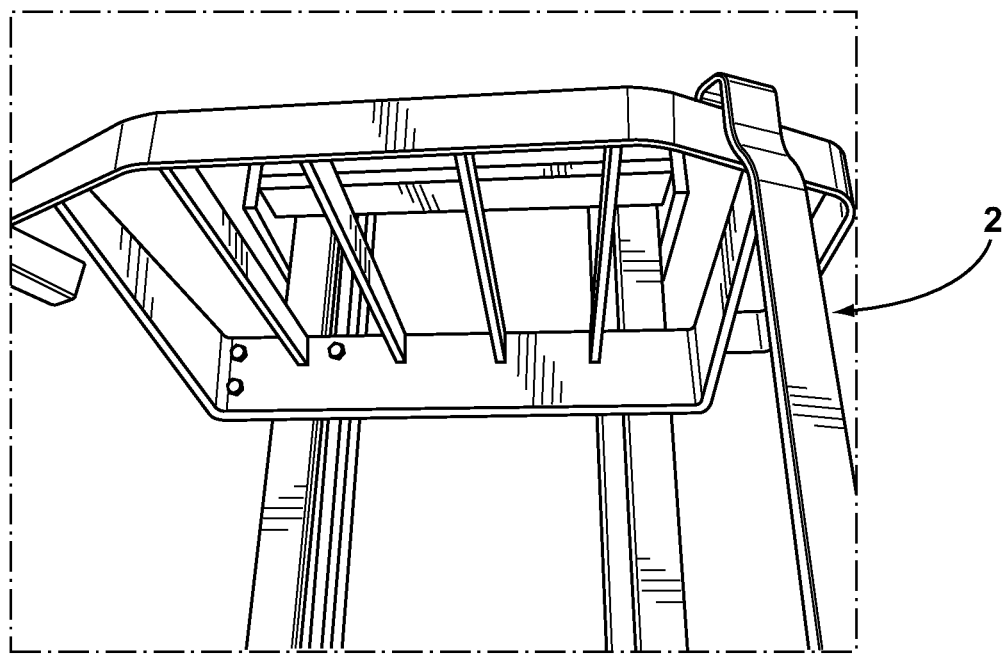
FIG. 27 is an illustration of the overhead guard after cube drop test completion.
Figure 28:
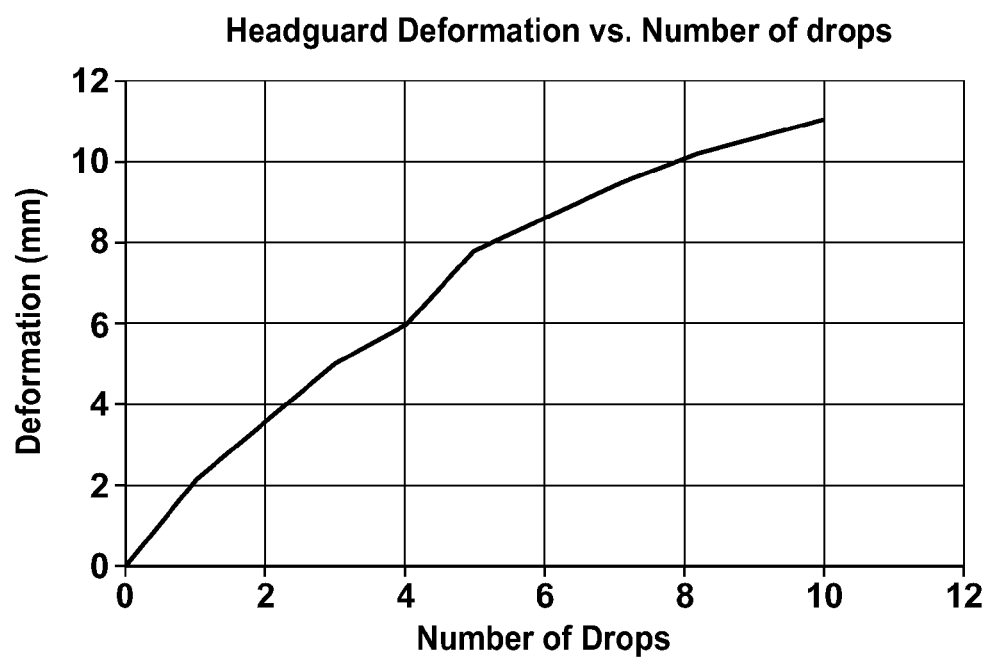
FIG. 28 illustrates a chart disclosing the relationship of the overhead guard deformation versus number of drops in a cube drop test performed using a safety bar in accordance with an embodiment.

The illustration of the overhead guard after cube drop test completion is presented in FIG. 27. The permanent overhead guard deformation vs. number of drops curve is presented in FIG. 28.

The total deflection of the overhead guard after ten (10) drop tests is 11.049 mm, below the maximum of 19 mm allowed by the standard. The overhead guard, tested with the safety bar attached to the lift truck, meets the ASME 656.1-2004, Section 7.29.2 (b) Cube Drop Test.

Impact Drop Test (Section 7.29.2 from ASME B56.1-2004)

The measured distance between the surface where the operator stands and a horizontal plane tangent to the underside of the overhead guard before test was 1,993 mm and after the impact test is 1,965 mm. The height after test is higher than minimum test requirement of 1,625 mm.

The overhead guard, tested with the safety bar attached to the lift truck, meets the ASME B56.1-2004, Section 7.29.2 (c) Impact Drop Test.

As a result of overhead guard deformation, the safety bar also permanently deformed outward, approximately 2 in at the centre, from initial shape.

Figure 29:
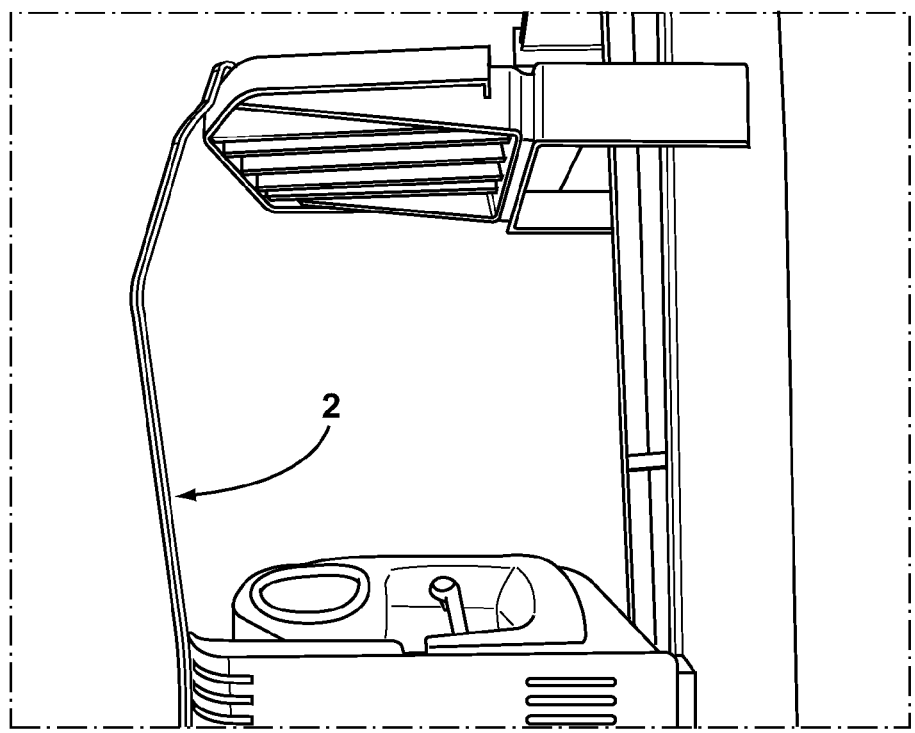
FIG. 29 is an illustration of the overhead guard after impact drop test completion.

The illustration of the overhead guard after impact drop test completion is presented in FIG. 29.

Safety Bar Strength (Custom Bend Test)

The bending test was stopped when a maximum deformation of the safety bar of 4 in was achieved. The maximum sustained test load was 1,894 lbs corresponding to a deformation of 4.09 in.

The recorded test data, used to calculate the energy absorbed by the safety bar in the event of an impact with a fixed obstacle, provides the information in regard to speed travel of the lift truck that in order to develop the same deformation into the safety bar. The lift truck calculated travel speed is presented in Table 2 below.

TABLE 2

Calculated lift travel speeds

| Lift Truck Configuration | Calculated Travel Speed (km/h) |
|---|---|
| Unloaded truck with two (2) safety bars installed | 2.0 |
| Unloaded truck with one (1) safety bar installed | 1.4 |
| Loaded truck with two (2) safety bars installed | 1.6 |
| Loaded truck with one (1) safety bar installed | 1.1 |

Figure 30:
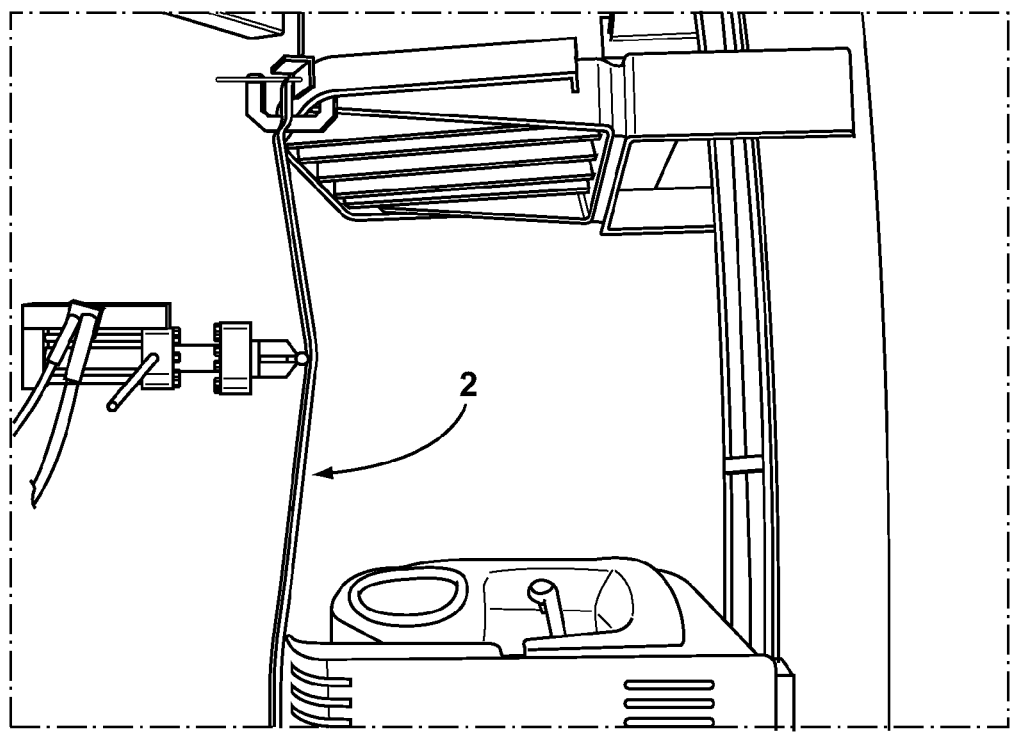
FIG. 30 is an illustration of an embodiment of the safety bar after the strength test.
Figure 31:
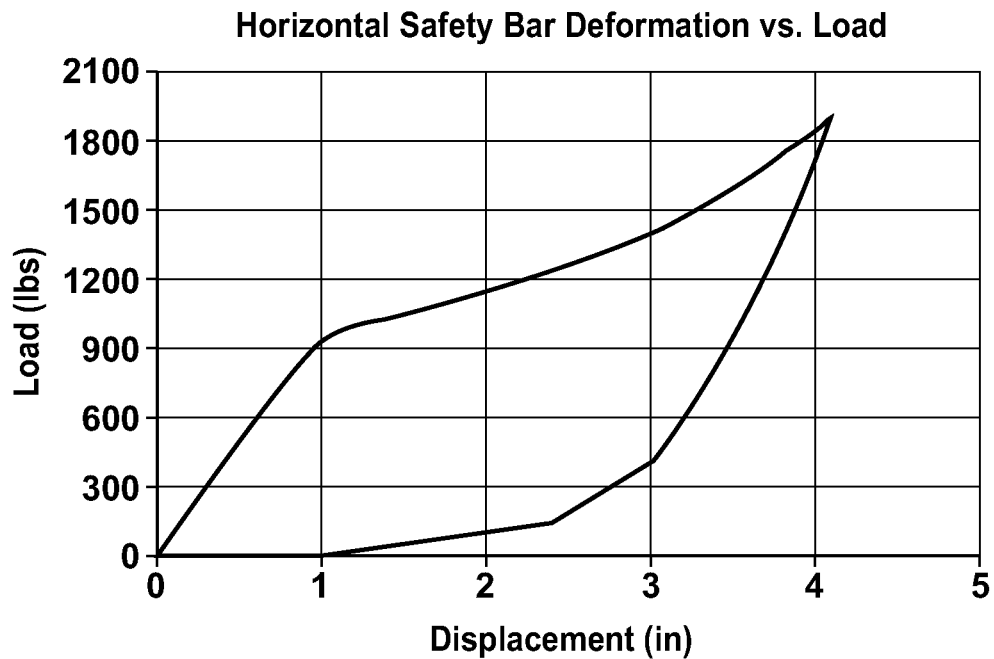
FIG. 31 illustrates a chart disclosing the relationship of the load versus horizontal safety bar deformation on a safety bar in accordance with an embodiment.
Figure 32:
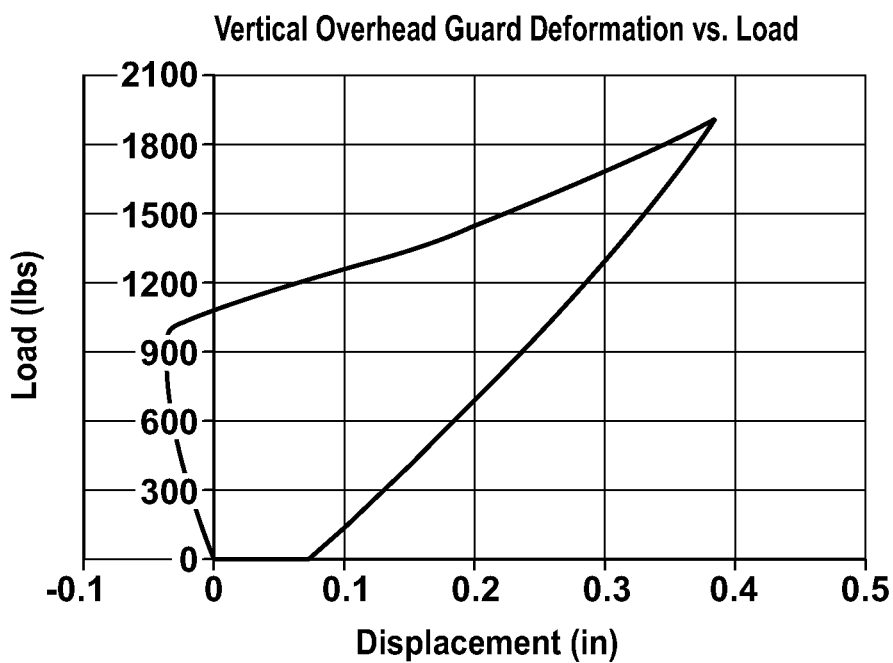
FIG. 32 illustrates a chart disclosing the relationship of the load versus overhead guard deformation when using a safety bar in accordance with an embodiment.

The illustration of the safety bar after the strength test is presented in FIG. 30. The load vs. deformation curves (imperial units) are presented in FIGS. 31 and 32.

The safety bar permanent deformation after test, in horizontal loading direction, is 26.73 mm. The overhead guard maximum deformation is 9.84 mm and the permanent deformation after test, in vertical orientation is 1.88 mm. The measured distance between the surface where the operator stands and a horizontal plane tangent to the underside of the overhead guard before test was 1,965 mm and after the load test is 1,963 mm, higher than minimum test requirement of 1,625 mm for the operator to be safe.

The basic equation used for calculation of the travel speed based on load test results is presented below:

Basic Equation Used

Linear spring $\Rightarrow$ simple harmonic motion for relative displacement $\delta$ at frequency $\omega$ where $\omega t_f = \pi$.

Change in momentum of relative motion=impulse, Eq. (1.4):

$$mv_0 = \int_0^{t_f} F(t)dt = \int_0^{t_f} F_{max} \sin(\omega t)dt$$

$$mv_0 = \frac{F_{max}}{\omega}$$

$$\omega = \frac{\pi}{\Delta t}$$

$$\Delta t = \frac{2d}{v_0};$$

where d is the deceleration distance $$mv_0 = \frac{F_{max} 2d}{\pi v_0}$$

$$v_0^2 = \frac{F_{max} 2d}{\pi m}$$

$$v_0 = \sqrt{\frac{F_{max} 2d}{\pi m}}$$

For Empty and One Bar:
$F_{max}$=1894 lbs (8424 N)
d=4.09 in (0.104 m)
m=8130 lbs (3687 kg)
$v_0$=0.388708 m/s=1.4 km/h For Empty and Two Bars:
$F_{max}$=3788 lbs (16850 N)
d=4.09 in (0.104 m)
m=8130 lbs (5729 kg)
$v_0$=0.549716 m/s=2 km/h For Loaded and One Bar:
$F_{max}$=1894 lbs (8424 N)
d=4.09 in (0.104 m)
m=12630 lbs (3687 kg)
$v_0$=0.311865 m/s=1.1 km/h For Loaded and Two Bars:
$F_{max}$=3788 lbs (16850 N)
d=4.09 in (0.104 m)
m=12630 lbs (5729 kg)
$v_0$=0.441044 m/s=1.6 km/h In the event of an impact with a mobile obstacle, the deformation of the safety bar could be smaller, providing that the impact will take place at the same calculated speed values and in the same orientation and height, depending on mass and coefficient of friction of the obstacle.

The required bending load was applied in displacement control at a constant rate of 1 in/min, until a maximum safety bar deflection of 4 in was achieved (considered maximum allowed deflection while the operator is still safe, based on space availability). The load and displacement data were continuously recorded. The recorded data were used to assess the capability of the safety bar to absorb the energy of a sudden impact against a fixed obstacle, by calculating the maximum allowable travel speed with the lift truck loaded and unloaded. The test was performed at the worse case scenario location (mid span between top and bottom attachments of the safety bar).

The various example embodiments described as systems would similarly apply to methods, and vice-versa. Reference to connected includes direct connections as well as indirect connections.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the described embodiments. The subject matter described herein intends to cover and embrace all suitable changes in technology.

The invention claimed is:

1. A lift truck guard system, comprising:
   a lift truck having an overhead guard, the overhead guard having an exterior facing surface and an interior facing surface;
   a safety bar configured to mount to the overhead guard of the lift truck, the safety bar including a shaft, a head, and a resilient arcuate neck connecting the shaft to the head;
   the head comprising a surface connected to at least one pair of spaced apart opposing legs;
   the surface and the spaced apart opposing legs defining a passage and a channel, the channel being intermediate the surface and the passage;
   a fastener positioned to secure but not fix one of the legs of the safety bar by frictionally engaging one end of the fastener to the interior facing surface of the overhead guard without penetrating the overhead guard; and
   a removable spacer located between the safety bar and the overhead guard without being penetrated by the fastener and dimensioned to define dimensions of the channel, wherein the removable spacer is removable so that a space is defined in the channel by the safety bar and the overhead guard.

2. The lift truck guard system according to claim 1, wherein the resilient arcuate neck is connected to a leg of the spaced apart opposing legs.

3. The lift truck guard system according to claim 1, wherein the head includes an inverted U-shaped member.

4. The lift truck guard system according to claim 1, wherein a leg of the spaced apart opposing legs defining the passage is adapted for receiving the fastener.

5. The lift truck guard system according to claim 4, wherein the leg has an aperture adapted for receiving the fastener.

6. The lift truck guard system according to claim 1, wherein the resilient arcuate neck comprises a s-shaped arcuate neck.

7. The lift truck guard system according to claim 1, wherein longitudinal axes of each of the at least one pair of spaced apart opposing legs is parallel to and offset from a longitudinal axis of the shaft at the neck.

8. The lift truck guard system according to claim 1, wherein the shaft has a distal end distal from the head, the distal end having an aperture adapted for receiving a fastener to fixedly mount to a body of the lift truck.

9. The lift truck guard system according to claim 1, wherein the safety bar is of unitary construction.

10. The lift truck guard system according to claim 1, wherein the safety bar is formed of steel.

11. The lift truck guard system according to claim 1, wherein the fastener is configured to frictionally engage the overhead guard.

12. The lift truck guard system according to claim 1, wherein the shaft is dimensioned to have a length which extends at least from the overhead guard to a body of the lift truck.

13. A method comprising:
   providing a safety bar including a shaft, a head, and a resiliently flexible arcuate neck connecting the shaft to the head, wherein the head includes a surface connected to at least one pair of spaced apart opposing legs, and wherein the surface and the spaced apart opposing legs define a passage and a channel, the channel being intermediate the surface and the passage, wherein the passage is dimensioned for receiving at least part of an overhead guard of a lift truck within the passage, the overhead guard having an exterior facing surface and an interior facing surface;
   mounting the safety bar to the overhead guard of the lift truck by receiving the overhead guard of the lift truck within the passage;
   inserting a removable spacer dimensioned to define dimensions of the channel into the channel between the safety bar to the overhead guard;
   securing but not fixing a fastener through one of the legs of the safety bar by frictionally engaging one end of the fastener to the interior facing surface of the overhead guard without penetrating the overhead guard or the removable spacer; and
   removing the removable spacer after securement of the safety bar to the overhead guard so that a space is defined in the channel by the safety bar and the overhead guard.

14. A lift truck system, comprising:
   a lift truck including a body and an overhead guard over the body, the overhead guard having an exterior facing surface and an interior facing surface;
   a safety bar configured to mount to the overhead guard of the lift truck, the safety bar including a shaft, a head, and a resilient arcuate neck connecting the shaft to the head;
   the head comprising a surface connected to at least one pair of spaced apart opposing legs;
   the surface and the spaced apart opposing legs defining a passage and a channel, the channel being intermediate the surface and the passage, wherein the passage is dimensioned for receiving at least part of the overhead guard of the lift truck within the passage;

a fastener positioned to secure but not fix one of the legs of the safety bar by frictionally engaging one end of the fastener to the interior facing surface of the overhead guard without penetrating the overhead guard; and a removable spacer located between the safety bar and the overhead guard without being penetrated by the fastener and dimensioned to define dimensions of the channel, wherein the removable spacer is removable so that a space is defined in the channel by the safety bar and the overhead guard.

* * * * *